(12) United States Patent
Gao et al.

(10) Patent No.: US 10,362,607 B2
(45) Date of Patent: Jul. 23, 2019

(54) WIRELESS COMMUNICATION METHOD, ENODE B AND USER EQUIPMENT WITH COVERAGE ENHANCEMENT (CE) LEVEL SELECTION

(71) Applicant: Panasonic Intellectual Property Corporation of America, Torrance, CA (US)

(72) Inventors: Chi Gao, Beijing (CN); Hidetoshi Suzuki, Kanagawa (JP); Prateek Basu Mallick, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/818,612

(22) Filed: Nov. 20, 2017

(65) Prior Publication Data
US 2018/0077737 A1 Mar. 15, 2018

Related U.S. Application Data

(63) Continuation of application No. PCT/CN2015/086895, filed on Aug. 13, 2015.

(51) Int. Cl.
*H04W 4/00* (2018.01)
*H04W 74/08* (2009.01)
(Continued)

(52) U.S. Cl.
CPC ......... *H04W 74/0833* (2013.01); *H04W 4/70* (2018.02); *H04W 72/042* (2013.01);
(Continued)

(58) Field of Classification Search
CPC . H04W 74/0833; H04W 4/70; H04W 72/042; H04W 8/26; H04W 88/02; H04W 88/08
See application file for complete search history.

(56) References Cited

U.S. PATENT DOCUMENTS

2012/0300714 A1* 11/2012 Ng ................... H04W 56/0045
370/329
2015/0016312 A1 1/2015 Li et al.
(Continued)

FOREIGN PATENT DOCUMENTS

| CN | 104519591 A | 4/2015 |
| WO | 2015/116732 A1 | 8/2015 |

OTHER PUBLICATIONS

The Extended European Search Report dated Jun. 29, 2018 for the related European Patent Application No. 15900788.9-1215 / 3335510, 10 pages.
(Continued)

*Primary Examiner* — Abdelnabi O Musa
(74) *Attorney, Agent, or Firm* — Seed IP Law Group LLP

(57) ABSTRACT

Provided are wireless communication methods, an eNB and a UE. A wireless communication method with coverage enhancement performed by an eNB comprises transmitting one or more MAC RARs to one or more UEs in response to receiving one or more random access preambles (RA-preambles) from the one or more UEs, wherein the transmitting is able to be performed by a first manner in which the MAC RAR(s) in response to the RA-preamble(s) belonging to one RA-preamble set corresponding to one CE level are carried by a PDSCH which is scheduled by a first PDCCH scrambled by a set-specific RNTI, and the set-specific RNTI is related to the set index of the one RA-preamble set.

20 Claims, 2 Drawing Sheets

(51) Int. Cl.
  *H04W 4/70* (2018.01)
  *H04W 72/04* (2009.01)
  *H04W 8/26* (2009.01)
  *H04W 88/02* (2009.01)
  *H04W 88/08* (2009.01)

(52) U.S. Cl.
  CPC .............. *H04W 8/26* (2013.01); *H04W 88/02* (2013.01); *H04W 88/08* (2013.01)

(56) References Cited

U.S. PATENT DOCUMENTS

| | | |
|---|---|---|
| 2015/0156760 A1 | 6/2015 | Yu et al. |
| 2016/0192420 A1* | 6/2016 | Kim ...................... H04W 74/00 370/329 |
| 2016/0219622 A1 | 7/2016 | Liu et al. |
| 2016/0295609 A1* | 10/2016 | Vajapeyam ............... H04L 5/14 |
| 2016/0338111 A1* | 11/2016 | Han ................... H04W 74/0833 |
| 2018/0063722 A1* | 3/2018 | Lee ........................ H04W 16/26 |
| 2018/0077729 A1* | 3/2018 | Lee ...................... H04W 72/042 |

OTHER PUBLICATIONS

MediaTek Inc., RAR/Paging Enhancement for Rel-13 LC-MTC UEs, 3GPP TSG-RAN WG1 #81 R1-153336, 3GPP, May 16, 2015.
Huawei, HiSilicon, RAR transmission for MTC UEs, 3GPP TSG-RAN WG1 #80bis R1-151269, 3GPP, Apr. 10, 2015.
Panasonic, Common control messages for MTC UEs, 3GPP TSG-RAN WG1 #81 R1-152691, 3GPP, May 15, 2015.
Huawei, T-CRNTI assignment in Msg2, 3GPP TSG-RAN WG2 #61bis R2-081652, 3GPP, Mar. 25, 2008.
International Search Report of PCT application No. PCT/CN2015/086895 dated May 17, 2016.

* cited by examiner

WIRELESS COMMUNICATION METHOD, ENODE B AND USER EQUIPMENT WITH COVERAGE ENHANCEMENT (CE) LEVEL SELECTION

BACKGROUND

1. Technical Field

The present disclosure relates to the field of wireless communication, and in particular, to wireless communication methods, an eNode B (eNB) and a user equipment (UE).

2. Description of the Related Art

For Machine-Type Communication (MTC) with coverage enhancement, multiple coverage enhancement (CE) levels are supported. For each CE level, there is one set of random access (RA) preambles. There are multiple RA-preambles in each set. For random access, a UE will select one CE level based on measurement or other methods and choose one RA-preamble in the set corresponding to the selected CE level. The UE sends Physical Random Access Channel (PRACH) carrying the selected RA-preamble to an eNB. If the PRACH is detected by the eNB, the eNB needs to send a medium access control (MAC) random access response (RAR) to the UE to inform UE.

SUMMARY

One non-limiting and exemplary embodiment provides an approach to determine the RNTI for scrambling the PDCCH related to the RAR in wireless communication with coverage enhancement.

In one general aspect, the techniques disclosed here feature a wireless communication method with coverage enhancement (CE) performed by an eNode B (eNB), comprising: transmitting one or more medium access control (MAC) random access responses (RARs) to one or more user equipments (UEs) in response to receiving one or more random access preambles (RA-preambles) from the one or more UEs, wherein the transmitting is able to be performed by a first manner in which the MAC RAR(s) in response to the RA-preamble(s) belonging to one RA-preamble set corresponding to one CE level are carried by a physical downlink shared channel (PDSCH) which is scheduled by a first physical downlink control channel (PDCCH) scrambled by a set-specific radio network temporary identity (RNTI), and the set-specific RNTI is related to the set index of the one RA-preamble set.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
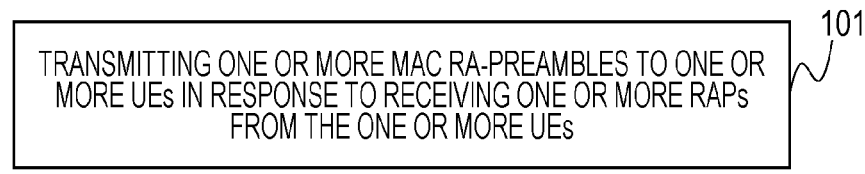
FIG. 1 schematically illustrates a flowchart of a wireless communication method for an eNB according to an embodiment of the present disclosure.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In the present disclosure, MTC may be taken as an example to describe the principle of the present disclosure; however, it is noted that the wireless communication methods disclosed in the present disclosure can not only be applied to MTC, but also be applied to other wireless communications such as other communications conforming to LTE specifications as long as those wireless communications may require coverage enhancement (CE). Accordingly, the UEs are not limited to MTC UEs, but can be any other UEs that can perform the communication methods described in the present disclosure.

As described in the above, if the PRACH carrying a selected RA-preamble is detected by the eNB, the eNB needs to send a MAC RAR to the UE to inform UE. The MAC RAR can be sent by either of following methods:

Method 1: A single MAC RAR is carried by a physical downlink control channel (PDCCH, for example MTC PDCCH) only.

Method 2: One or multiple MAC RARs are carried by physical downlink shared channel (PDSCH) which is scheduled by PDCCH.

The PDCCH in either of the methods needs to be scrambled by a radio network temporary identity (RNTI), and thus how to determine the RNTI needs to be solved.

In one embodiment, the legacy RA-RNTI equation can be reused to determine the RA-RNTI for communication with coverage enhancement, which is:

$$RA\text{-}RNTI = 1 + t\_id + 10 * f\_id$$

where t_id is the subframe index where the RA-preamble (i.e., the PRACH carrying the RA-preamble) was sent, and f_id is the resource index in frequency domain of the PRACH.

In another embodiment, for PDCCH carrying single MAC RAR without PDSCH, the RNTI used for scrambling the PDCCH can be related to the RA-preamble (RA-preamble) index corresponding to the MAC RAR; for PDCCH scheduling PDSCH carrying one or multiple MAC RARs, the RNTI used for scrambling the PDCCH is related to the set index to which the corresponding RA-preamble(s) belong.

According to this embodiment, there are following benefits. For PDCCH carrying single MAC RAR without PDSCH (Method 1), if the preamble-specific RNTI is not used, the preamble index (6 bits) should be included in the DCI carried by the PDCCH. With the preamble-specific RNTI used, UE can deduce the preamble index by the RNTI and judge whether the PDCCH carrying a single MAC RAR is for it or not. Thus, signaling overhead can be reduced. For PDCCH scheduling PDSCH carrying one or multiple MAC RARs (Method 2), the MAC RARs corresponds to the preambles in the same set are transmitted in one packet. UE can only monitor its own set specific RNTI. If succeeded, the UE decodes the scheduled PDSCH; otherwise, it needn't to decode the PDSCH. Thus, UE's decoding complexity can be reduced. In addition, for PDCCH scheduling PDSCH carrying one or multiple MAC RARs (Method 2), according to this embodiment of the present disclosure, MAC RARs in the same CE level are transmitted in one packet. For MAC RARs in lower CE level, fewer repetitions are transmitted in fewer resources, and the corresponding UEs can detect it within less time with less power. This reduces the resource usage and power consumption of UE.

According to the inventive concept of the present disclosure, in an embodiment, a wireless communication method 100 with coverage enhancement (CE) performed by an eNB is provided. As shown in FIG. 1, the method 100 comprises a step 101 of transmitting one or more MAC RARs to one or more UEs in response to receiving one or more random access preambles (RA-preambles) from the one or more UEs. The eNB may receive one or more RA-preambles at the same time, and thus it needs to transmit one or more MAC RARs respectively corresponding to the received one or more RA-preambles.

In this embodiment, the transmitting is able to be performed by a first manner, which means that the transmitting can be performed at least by the first manner, and may also be able to be performed by one or more other manners. The first manner is corresponding to the above Method 2. In the first manner, the MAC RAR(s) in response to the RA-preamble(s) belonging to one RA-preamble set corresponding to one CE level are carried by a PDSCH which is scheduled by a first PDCCH scrambled by a set-specific RNTI, and the set-specific RNTI is related to the set index of the one RA-preamble set. In other words, the MAC RARs in response to the received one or more RA-preambles are divided into different groups based on different RA-preamble sets (corresponding to different CE levels) to which the received one or more RA-preambles belong, and the MAC RARs in the same group are transmitted together in a PDSCH which is scheduled by a PDCCH. The PDCCH is scrambled by a set-specific RNTI which is related to the set index corresponding to the transmitting MAC RAR group. The set-specific RNTI is set specific and can be determined by the RA-preamble set index and optionally other parameters such as t_id and f_id. According to this embodiment, the UE can only monitor its own set specific RNTI, and the UE's decoding complexity can be reduced. In addition, it is possible to reduce the resource usage and power consumption of a UE in lower CE level.

Additionally, the transmitting can be performed by one of the first manner and a second manner. The second manner is corresponding to the above Method 1. In the second manner, a single MAC RAR in response to one received RA-preamble is carried by a second PDCCH scrambled by a preamble-specific RNTI, and the preamble-specific RNTI is related to the RA-preamble index of the RA-preamble to which the single MAC RAR is in response. In the second manner, the PDCCH is scrambled by a preamble-specific RNTI which is RA-preamble specific and can be determined by the RA-preamble index and optionally other parameters such as t_id and f_id. With this manner, signaling overhead can be reduced.

In specific implementation, which transmitting manner is to be adopted by the eNB can be configured by the MAC layer or RRC layer, or can be determined by the eNB without notifying the UE. If the eNB adopts a transmitting manner without notifying the UE, the UE can blindly detect the PDCCH.

Figure 2:
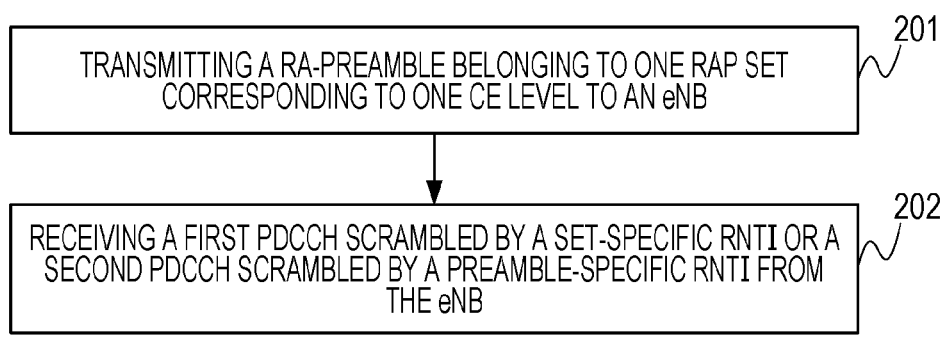
FIG. 2 schematically illustrates a flowchart of a wireless communication method for a UE according to an embodiment of the present disclosure.

Accordingly, at the UE side, in an embodiment, a wireless communication method 200 with coverage enhancement performed by a UE is provided. As shown in FIG. 2, the method 200 comprises: a step 201 of transmitting a RA-preamble belonging to one RA-preamble set corresponding to one CE level to an eNB; and a step 202 of receiving a PDCCH scrambled by a set-specific RNTI or a second PDCCH scrambled by a preamble-specific RNTI from the eNB. In step 201, the UE selects a RA-preamble from the RA-preamble set corresponding to the selected CE level and transmits the RA-preamble (for example, in PRACH) the eNB. The eNB will transmit a RAR by the above first or second manner in response to the RA-preamble to the UE after receiving the RA-preamble. In step 202, the UE receives a first or second PDCCH related to the RAR, and the first or second PDCCH is scrambled by a set-specific RNTI or a preamble-specific RNT. In this embodiment, the first PDCCH schedules a PDSCH carrying a MAC RAR in response to the transmitted RA-preamble, and the set-specific RNTI is related to the set index of the one RA-preamble set. The second PDCCH carries the MAC RAR in response to the transmitted RA-preamble, and the preamble-specific RNTI is related to the RA-preamble index of the transmitted RA-preamble. The first PDCCH and the second PDCCH are corresponding to the above first manner and second manner respectively. The set-specific RNTI is set specific and can be determined by the RA-preamble set index and optionally other parameters such as t_id and f_id. The preamble-specific RNTI is RA-preamble specific and can be determined by the RA-preamble index and optionally other parameters such as t_id and f_id. According to this embodiment, the UE can only monitor its own set specific RNTI, and the UE's decoding complexity can be reduced. In addition, it is possible to reduce the resource usage and power consumption of a UE in lower CE level. Further, signaling overhead can be reduced.

Figure 3:
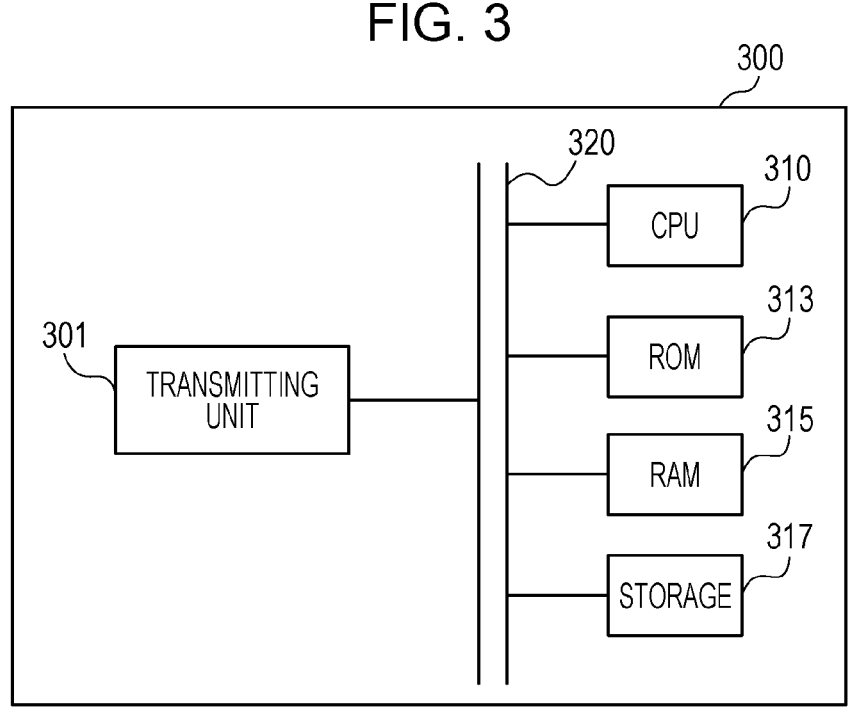
FIG. 3 schematically illustrates a block diagram of an eNB for wireless communication according to an embodiment of the present disclosure.

Corresponding to the above methods, in embodiments of the presents, an eNB and a UE are also provided. FIG. 3 schematically illustrates a block diagram of an eNB 300 for wireless communication with coverage enhance according to an embodiment of the present disclosure. The eNB 300 can comprise a transmitting unit 301 configured to transmit one or more MAC random access responses (RARs) to one or more user equipments (UEs) in response to receiving one or more random access preambles (RA-preambles) from the one or more UEs, wherein the transmitting is able to be performed by a first manner in which the MAC RAR(s) in response to the RA-preamble(s) belonging to one RA-preamble set corresponding to one CE level are carried by a physical downlink shared channel (PDSCH) which is scheduled by a first physical downlink control channel (PDCCH) scrambled by a set-specific radio network temporary identity (RNTI), and the set-specific RNTI is related to the set index of the one RA-preamble set.

The eNB 300 according to the present disclosure may optionally include a CPU (Central Processing Unit) 310 for executing related programs to process various data and control operations of respective units in the eNB 300, a ROM (Read Only Memory) 313 for storing various programs required for performing various process and control by the CPU 310, a RAM (Random Access Memory) 315 for storing intermediate data temporarily produced in the procedure of process and control by the CPU 310, and/or a storage unit 317 for storing various programs, data and so on. The above transmitting unit 301, CPU 310, ROM 313, RAM 315 and/or storage unit 317 etc. may be interconnected via data and/or command bus 320 and transfer signals between one another.

Respective units as described above do not limit the scope of the present disclosure. According to one implementation of the disclosure, the functions of the above transmitting unit 301 may be implemented by hardware, and the above CPU 310, ROM 313, RAM 315 and/or storage unit 317 may not be necessary. Alternatively, the functions of the above transmitting unit 301 may also be implemented by functional software in combination with the above CPU 310, ROM 313, RAM 315 and/or storage unit 317 etc.

Figure 4:
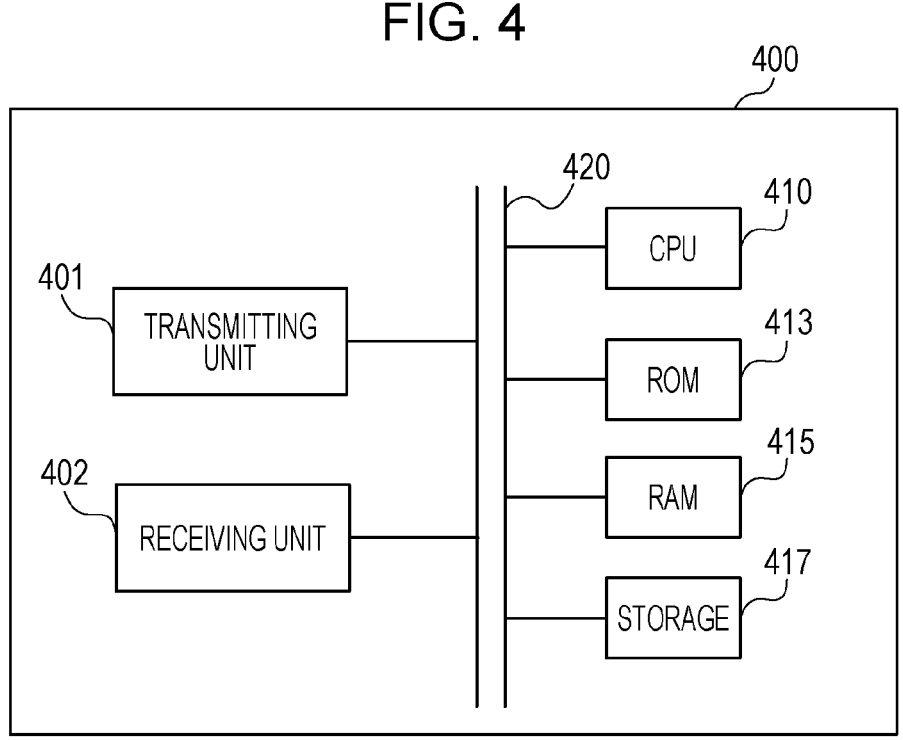
FIG. 4 schematically illustrates a block diagram of a UE for wireless communication according to an embodiment of the present disclosure.

FIG. 4 schematically illustrates a block diagram of an UE 400 for wireless communication with coverage enhancement according to an embodiment of the present disclosure. The UE 400 can comprise a transmitting unit 401 configured to transmit a random access preamble (RA-preamble) belonging to one RA-preamble set corresponding to one CE level to an eNode B (eNB); and a receiving unit 402 configured to receive a first physical downlink control channel (PDCCH) scrambled by a set-specific radio network temporary identity (RNTI) or a second PDCCH scrambled by a preamble-specific RNTI from the eNB, wherein the first PDCCH schedules a physical downlink shared channel (PDSCH) carrying a medium access control (MAC) random access response (RAR) in response to the transmitted RA-preamble, and the set-specific RNTI is related to the set index of the one RA-preamble set; and the second PDCCH carries the MAC RAR in response to the transmitted RA-preamble, and the preamble-specific RNTI is related to the RA-preamble index of the transmitted RA-preamble.

The UE 400 according to the present disclosure may optionally include a CPU (Central Processing Unit) 410 for executing related programs to process various data and control operations of respective units in the UE 400, a ROM (Read Only Memory) 413 for storing various programs required for performing various process and control by the CPU 410, a RAM (Random Access Memory) 415 for storing intermediate data temporarily produced in the procedure of process and control by the CPU 410, and/or a storage unit 417 for storing various programs, data and so on. The above transmitting 401, receiving unit 402, CPU 410, ROM 413, RAM 415 and/or storage unit 417 etc. may be interconnected via data and/or command bus 420 and transfer signals between one another.

Respective units as described above do not limit the scope of the present disclosure. According to one implementation of the disclosure, the functions of the above transmitting 401 and receiving unit 402 may be implemented by hardware, and the above CPU 410, ROM 413, RAM 415 and/or storage unit 417 may not be necessary. Alternatively, the functions of the above transmitting 401 and receiving unit 402 may also be implemented by functional software in combination with the above CPU 410, ROM 413, RAM 415 and/or storage unit 417 etc.

It is noted that the above descriptions for the communication methods can also applied to the UE or eNB, which will not repeated herein.

In the following, several examples for specifically determining the RNTI are provided. It is noted that those examples do not limit the scope of the present disclosure. The combinations of the set-specific RNTI and the preamble-specific RNTI in those examples are optional not mandatory. The determination methods for the set-specific RNTI and the preamble-specific RNTI in those examples can be adopted independently.

In a first example, the preamble-specific RNTI can be determined by:

$$RNTI_{p,i} = (1 + t\_id + 10 * f\_id) * (N_i + 1) + index_{p,i} + offset_i \quad (1);$$

the set-specific RNTI is determined by:

$$RNTI_i = (1 + t\_id + 10 * f\_id) * (N_i + 1) + N_i + offset_i \quad (2), or$$

$$RNTI_i = (1 + t\_id + 10 * f\_id) * (N_i + 1) - 1 + offset_i \quad (3),$$

where $RNTI_{p,i}$ is the preamble-specific RNTI corresponding to the RA-preamble p in the RA-preamble set i, $RNTI_i$ is the set-specific RNTI corresponding to the RA-preamble set i, i is the index of the RA-preamble set, t_id is the subframe index where the RA-preamble corresponding to the transmitting MAC RAR was sent (i.e., the subframe index where the PRACH carrying the RA-preamble is sent), f_id is the resource index in frequency domain where the RA-preamble corresponding to the transmitting MAC RAR was sent (i.e., the resource index in frequency domain of the PRACH carrying the RA-preamble), $N_i$ is the number of RA-preamble indices in the RA-preamble set i, $index_{p,i}$ is the index of the RA-preamble p within the RA-preamble set i, and $offset_i$ is an integer offset which is RA-preamble set specific. The $offset_i$ can be determined arbitrarily as needed, for example, it can be specified or configured in the MAC layer or RRC layer. It is noted that the indices (e.g., the set index i, $index_{p,i}$ or the like) can be integers started from 0. In addition, $index_{p,i}$ is numbered respectively within each RA-preamble set, in other words, $index_{p,i}$ would be renumbered from the start value (for example, 0) in each RA-preamble set, but not numbered successively following the last RA-preamble set.

The above equation (2) means that the set-specific preamble follows the preamble-specific RATIs in each set, and the above equation (3) means that the set-specific preamble is followed by the preamble-specific RATIs in each set. In addition, since the $offset_i$ can be determined arbitrarily as needed, with different value of $offset_i$, the above equations (1)-(3) can be written as equations (1')-(3') respectively:

$$RNTI_{p,i} = (t\_id + 10 * f\_id) * (N_i + 1) + index_{p,i} + offset_i \quad (1'),$$

$$RNTI_i = (t\_id + 10 * f\_id) * (N_i + 1) + N_i + offset_i \quad (2');$$

$$RNTI_i = (t\_id + 10 * f\_id) * (N_i + 1) - 1 + offset_i \quad (3').$$

As an instance, assuming t_id=0, f_id=0, there are 4 RA-preamble sets in all, and equations (1') and (2') are used, the RNTI can be allocated as Table 1.

TABLE 1

|  | set #0 | set #1 | set #2 | set #3 |
|---|---|---|---|---|
| Preamble specific RNTI | 0 + offset_0 | 0 + offset_1 | 0 + offset_2 | 0 + offset_3 |
| Preamble specific RNTI | 1 + offset_0 | 1 + offset_1 | 1 + offset_2 | 1 + offset_3 |

TABLE 1-continued

|  | set #0 | set #1 | set #2 | set #3 |
|---|---|---|---|---|
| Preamble specific RNTI | 2 + offset_0 | 2 + offset_1 | 2 + offset_2 | 2 + offset_3 |
| Preamble specific RNTI | 3 + offset_0 | 3 + offset_1 | 3 + offset_2 | 3 + offset_3 |
| Preamble specific RNTI | 4 + offset_0 | 4 + offset_1 | 4 + offset_2 | 4 + offset_3 |
| Preamble specific RNTI | ... | ... | ... | ... |
| Set specific RNTI | $N_{i=0}$ + offset_0 | $N_{i=1}$ + offset_1 | $N_{i=2}$ + offset_2 | $N_{i=3}$ + offset_3 |

In the first example, the set-specific RNTI follows or is followed by the preamble-specific RNTIs of each set and the offsets for different sets are independent. Therefore, the UE only needs to know the parameters of the RAR set of its own, and can work without the information of other sets.

In a second example, the preamble-specific RNTI is determined by:

$$RNTI_{p,i}=(1+t\_id+10*f\_id)*((N_{i-1}+1)*(i+1))+index_{p,i}+offset \quad (4);$$

the set-specific RNTI is determined by:

$$RNTI_i=(1+t\_id+10*f\_id)*((N_{i-1}+1)*(i+1))+N_i+offset \quad (5), or$$

$$RNTI_i=(1+t\_id+10*f\_id)*((N_{i-1}+1)*(i+1))-1+offset \quad (6),$$

where $RNTI_{p,i}$ is the preamble-specific RNTI corresponding to the RA-preamble p in the RA-preamble set i, $RNTI_i$ is the set-specific RNTI corresponding to the RA-preamble set i, i is the index of the RAP set, t_id is the subframe index where the RA-preamble corresponding to the transmitting MAC RAR was sent, f_id is the resource index in frequency domain where the RA-preamble corresponding to the transmitting MAC RAR was sent, $N_i$ is the number of RA-preamble indices in the RA-preamble set i, $N_{i-1}$ is the number of RA-preamble indices in the RA-preamble set i-1, $index_{p,i}$ is the index of the RA-preamble p within the RA-preamble set i, and offset is an integer offset which is common to all RA-preamble sets. The offset can be determined arbitrarily as needed, for example, it can be specified or configured in the MAC layer or RRC layer. N can be set as 0 or any other fixed value. Optionally, all the RA-preamble sets have the same number of RA-preambles, i.e., $N_i=N$ which is a fixed value. The above equation (5) means that the set-specific preamble follows the preamble-specific RATIs in each set, and the above equation (6) means that the set-specific preamble is followed by the preamble-specific RATIs in each set.

As an instance, assuming t_id=0, f_id=0, there are 4 RA-preamble sets in all and there are 16 RA-preambles in each set, $N_{-1}=0$, and equations (4) and (6) are used, the RNTI can be allocated as Table 2.

TABLE 2

|  | set #0 | set #1 | set #2 | set #3 |
|---|---|---|---|---|
| Set specific RNTI | Offset | 17 + offset | 34 + offset | 51 + offset |
| Preamble specific RNTI | 1 + offset | 18 + offset | 35 + offset | 52 + offset |
| Preamble specific RNTI | 2 + offset | 19 + offset | 36 + offset | 53 + offset |
| Preamble specific RNTI | 3 + offset | 20 + offset | 37 + offset | 54 + offset |
| Preamble specific RNTI | 4 + offset | 21 + offset | 38 + offset | 55 + offset |
| Preamble specific RNTI | 5 + offset | 22 + offset | 39 + offset | 56 + offset |
|  | ... | ... | ... | ... |
| Preamble specific RNTI | 16 + offset | 33 + offset | 50 + offset | 67 + offset |

In the second example, the offset is common for all the sets, which leads to continuous allocation of RAR RNTI for all the sets. Therefore, it makes the RNTI allocation clean and also reduces the parameters that need to be configured.

In a third example, the preamble-specific RNTI is determined by:

$$RNTI_p=(t\_id+10*f\_id)*(N\_p+N\_set)+index_p+offset \quad (7);$$

the set-specific RNTI is determined by:

$$RNTI_i=(t\_id+10*f\_id)*(N\_p+N\_set)-i-1+offset \quad (8), or$$

$$RNTI_i=(t\_id+10*f\_id)*(N\_p+N\_set)+N\_p+i+offset \quad (9),$$

where $RNTI_p$ is the preamble-specific RNTI corresponding to the RA-preamble p, $RNTI_i$ is the set-specific RNTI corresponding to the RA-preamble set i, i is index of the RA-preamble set i, t_id is the subframe index where the RA-preamble corresponding to the transmitting MAC RAR was sent, f_id is the resource index in frequency domain where the RA-preamble corresponding to the transmitting MAC RAR was sent, N_p is the total number of RA-preamble indices in all RA-preamble sets, N_set is the total number of RA-preamble sets, $index_p$ is the index of the RA-preamble p within the N_p RA-preambles, and offset is an integer offset which is common to all RA-preamble sets. It is noted that the $index_p$ is different from the above $index_{p,i}$. $index_{p,i}$ is numbered within each set while $index_p$ is numbered among all RA-preambles in all sets.

In the third example, all the set-specific RNTIs follow or are followed by all the preamble RNTIs, and these RNTIs can be allocated successively.

In a fourth example, the least significant bits (LSBs) or the most significant bits (MSBs) of the preamble-specific RNTI corresponding to a specific RA-preamble can be determined by the index of the specific RA-preamble within all RA-preambles, and the other bits of the preamble-specific RNTI are fixed values. For example, the RA-preamble index can be interpreted to N bits, the N bits are used as the LSBs of the RNTI of the corresponding RAR, and the other bits of the RNTI are fixed values which can be specified in the specification.

As for the set-specific RNTI, the set-specific RNTI corresponding to a specific RA-preamble set can be a successive value to the values of the preamble-specific RNTIs corresponding to the RA-preambles in the specific RA-preamble set.

As an instance, the RNTIs allocated by the fourth example can be shown in Table 3.

TABLE 3

|  | Set #0 | set #1 | set #2 |
|---|---|---|---|
| Preamble specific RNTI | 1111111111000001 | 1111111111000110 | 1111111111001101 |
| Preamble specific RNTI | 1111111111000010 | 1111111111000111 | ... |
| Preamble specific RNTI | 1111111111000011 | 1111111111001000 | ... |
| Preamble specific RNTI | 1111111111000100 | 1111111111001001 | ... |
| Preamble specific RNTI |  | 1111111111001010 | ... |
| Preamble specific RNTI |  | 1111111111001011 | ... |
| Set specific RNTI | 1111111111000101 | 1111111111001100 | ... |

In the instance of Table 3, the number of RA-preambles in each set is different. The first 10 bits of the preamble-specific RNTIs are fixed to be "1111111111", and the 6 LSBs of the RNTIs are determined by the RA-preamble indices.

Alternatively, the set-specific RNTI corresponding to one RA-preamble set can also be determined by changing one or more bits other than the LSBs or the MSBs of the preamble-specific RNTI corresponding to any RA-preamble in the one RA-preamble set. For example, if the other bits than the LSBs or the MSBs in the preamble-specific RNTIs are filled with "1111111111" and one (for example the first one) of the preamble-specific RNTs in the set is "1111111111000001", then the set-specific RNTI can be "0111111111000001" by changing the first bit "1" of the "1111111111" into "0".

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

1. A wireless communication method with coverage enhancement (CE) performed by an eNode B (eNB), comprising:

transmitting one or more medium access control (MAC) random access responses (RARs) to one or more user equipments (UEs) in response to receiving one or more random access preambles (RA-preambles) from the one or more UEs, wherein the transmitting is able to be performed by a first manner in which the MAC RAR(s) in response to the RA-preamble(s) belonging to one RA-preamble set corresponding to one CE level are carried by a physical downlink shared channel (PDSCH) which is scheduled by a first physical downlink control channel (PDCCH) scrambled by a set-specific radio network temporary identity (RNTI), and the set-specific RNTI is related to the set index of the one RA-preamble set.

2. The wireless communication method according to 1, wherein the transmitting is performed by one of the first manner and a second manner, and in the second manner, a single MAC RAR in response to one received RA-preamble is carried by a second PDCCH scrambled by a preamble-specific RNTI, and the preamble-specific RNTI is related to the RA-preamble index of the RA-preamble to which the single MAC RAR is in response.

3. The wireless communication method according to 2, wherein the preamble-specific RNTI is determined by:

$$RNTI_p = (1+t\_id+10*f\_id)*(N_i+1)+index_{p,i}+offset_i$$

where $RNTI_{p,i}$ is the preamble-specific RNTI corresponding to the RA-preamble p in the RA-preamble set i, i is the index of the RAP set, t_id is the subframe index where the RA-preamble corresponding to the transmitting MAC RAR was sent, f_id is the resource index in frequency domain where the RA-preamble corresponding to the transmitting MAC RAR was sent, $N_i$ is the number of RA-preamble indices in the RA-preamble set i, $index_{p,i}$ is the index of the RA-preamble p within the RA-preamble set i, and $offset_i$ is an integer offset which is RA-preamble set specific.

4. The wireless communication method according to any of 1 to 3, wherein the set-specific RNTI is determined by:

$$RNTI_i = (1+t\_id+10*f\_id)*(N_i+1)+N_i+offset_i, \text{ or}$$

$$RNTI_i = (1+t\_id+10*f\_id)*(N_i+1)-1+offset_i,$$

where $RNTI_i$ is the set-specific RNTI corresponding to the RA-preamble set i, i is the index of the RAP set, t_id is the subframe index where the RA-preamble corresponding to the transmitting MAC RAR was sent, f_id is the resource index in frequency domain where the RA-preamble corresponding to the transmitting MAC RAR was sent, $N_i$ is the number of RA-preamble indices in the RA-preamble set i, and $offset_i$ is an integer offset which is RA-preamble set specific.

5. The wireless communication method according to 2, wherein
the preamble-specific RNTI is determined by:

$$RNTI_{p,i}=(1+t\_id+10*f\_id)*((N_{i-1}+1)*(i+1))+index_{p,i}+offset,$$

where $RNTI_{p,i}$ is the preamble-specific RNTI corresponding to the RA-preamble p in the RA-preamble set i, i is the index of the RAP set, t_id is the subframe index where the RA-preamble corresponding to the transmitting MAC RAR was sent, f_id is the resource index in frequency domain where the RA-preamble corresponding to the transmitting MAC RAR was sent, $N_{i-1}$ is the number of RA-preamble indices in the RA-preamble set i−1, $index_{p,i}$ is the index of the RA-preamble p within the RA-preamble set i, and offset is an integer offset which is common to all RA-preamble sets.

6. The wireless communication method according to any of 1, 2 and 5, wherein
the set-specific RNTI is determined by:

$$RNTI_i=(1+t\_id+10*f\_id)*((N_{i-1}+1)*(i+1))+N_i+offset,$$
or $$RNTI_i=(1+t\_id+10*f\_id)*((N_{i-1}+1)*(i+1))-1+offset,$$

where $RNTI_i$ is the set-specific RNTI corresponding to the RA-preamble set i, i is the index of the RAP set, t_id is the subframe index where the RA-preamble corresponding to the transmitting MAC RAR was sent, f_id is the resource index in frequency domain where the RA-preamble corresponding to the transmitting MAC RAR was sent, $N_i$ is the number of RA-preamble indices in the RA-preamble set i, $N_{i-1}$ is the number of RA-preamble indices in the RA-preamble set i−1, and offset is an integer offset which is common to all RA-preamble sets.

7. The wireless communication method according to 2, wherein the preamble-specific RNTI is determined by:

$$RNTI_p=(t\_id+10*f\_id)*(N\_p+N\_set)+index_p+offset,$$

where $RNTI_p$ is the preamble-specific RNTI corresponding to the RA-preamble p, t_id is the subframe index where the RA-preamble corresponding to the transmitting MAC RAR was sent, f_id is the resource index in frequency domain where the RA-preamble corresponding to the transmitting MAC RAR was sent, N_p is the total number of RA-preamble indices in all RA-preamble sets, N_set is the total number of RA-preamble sets, $index_p$ is the index of the RA-preamble p within the N_p RA-preambles, and offset is an integer offset which is common to all RA-preamble sets.

8. The wireless communication method according to any of 1, 2 and 7, wherein
the set-specific RNTI is determined by:

$$RNTI_i=(t\_id+10*f\_id)*(N\_p+N\_set)-i-1+offset, or$$

$$RNTI_i=(t\_id+10*f\_id)*(N\_p+N\_set)+N\_p+i+offset,$$

where $RNTI_i$ is the set-specific RNTI corresponding to the RA-preamble set i, i is index of the RA-preamble set i, t_id is the subframe index where the RA-preamble corresponding to the transmitting MAC RAR was sent, f_id is the resource index in frequency domain where the RA-preamble corresponding to the transmitting MAC RAR was sent, N_p is the total number of RA-preamble indices in all RA-preamble sets, N_set is the total number of RA-preamble sets, and offset is an integer offset which is common to all RA-preamble sets.

9. The wireless communication method according to 2, wherein
the least significant bits (LSBs) or the most significant bits (MSBs) of the preamble-specific RNTI corresponding to a specific RA-preamble are determined by the index of the specific RA-preamble within all RA-preambles, and the other bits of the preamble-specific RNTI are fixed values.

10. The wireless communication method according to 9, wherein
the set-specific RNTI corresponding to a specific RA-preamble set is a successive value to the values of the preamble-specific RNTIs corresponding to the RA-preambles in the specific RA-preamble set.

11. The wireless communication method according to 9, wherein
the set-specific RNTI corresponding to a specific RA-preamble set is determined by changing one or more bits other than the LSBs or the MSBs of the preamble-specific RNTI corresponding to any RA-preamble in the specific RA-preamble set.

12. A wireless communication method with coverage enhancement (CE) performed by a user equipment (UE), comprising:
transmitting a random access preamble (RA-preamble) belonging to one RA-preamble set corresponding to one CE level to an eNode B (eNB); and receiving a first physical downlink control channel (PDCCH) scrambled by a set-specific radio network temporary identity (RNTI) or a second PDCCH scrambled by a preamble-specific RNTI from the eNB, wherein
the first PDCCH schedules a physical downlink shared channel (PDSCH) carrying a medium access control (MAC) random access response (RAR) in response to the transmitted RA-preamble, and the set-specific RNTI is related to the set index of the one RA-preamble set; and the second PDCCH carries the MAC RAR in response to the transmitted RA-preamble, and the preamble-specific RNTI is related to the RA-preamble index of the transmitted RA-preamble.

13. The wireless communication method according to 12, wherein the preamble-specific RNTI is determined by:

$$RNTI=(1+t\_id+10*f\_id)*(N_i+1)+index_{p,i}+offset_i$$

where $RNTI_{p,i}$ is the preamble-specific RNTI corresponding to the RA-preamble p in the RA-preamble set i, i is the index of the RAP set, t_id is the subframe index where the transmitted RA-preamble was sent, f_id is the resource index in frequency domain where the transmitted RA-preamble was sent, $N_i$ is the number of RA-preamble indices in the RA-preamble set i, $index_1$, is the index of the RA-preamble p within the RA-preamble set i, and $offset_i$ is an integer offset which is RA-preamble set specific.

14. The wireless communication method according to 12 or 13, wherein
the set-specific RNTI is determined by:

$$RNTI_i=(1+t\_id+10*f\_id)*(N_i+1)+N_i+offset_i, or$$

$$RNTI=(1+t\_id+10*f\_id)*(N+1)-1+offset_i,$$

where $RNTI_i$ is the set-specific RNTI corresponding to the RA-preamble set i, i is the index of the RAP set, t_id is the subframe index where the transmitted RA-preamble was sent, f_id is the resource index in frequency domain where the transmitted RA-preamble was sent, $N_i$ is the number of RA-preamble indices in the RA-preamble set i, and $offset_i$ is an integer offset which is RA-preamble set specific.

15. The wireless communication method according to 12, wherein
the preamble-specific RNTI is determined by:

$$RNTI = (1 + t\_id + 10 * f\_id) * ((N+1) * (i+1)) + index_{p,i} + offset,$$

where $RNTI_p$, is the preamble-specific RNTI corresponding to the RA-preamble p in the RA-preamble set i, i is the index of the RAP set, t_id is the subframe index where the transmitted RA-preamble was sent, f_id is the resource index in frequency domain where the transmitted RA-preamble was sent, $N_{i-1}$ is the number of RA-preamble indices in the RA-preamble set i−1, $index_{p,i}$ is the index of the RA-preamble p within the RA-preamble set i, and offset is an integer offset which is common to all RA-preamble sets.

16. The wireless communication method according to 12 or 15, wherein
the set-specific RNTI is determined by:

$$RNTI_i = (1 + t\_id + 10 * f\_id) * ((N_{i-1}+1) * (i+1)) + N_i + offset,$$
or
$$RNTI_i = (1 + t\_id + 10 * f\_id) * ((N_{i-1}+1) * (i+1)) - 1 + offset,$$

where $RNTI_i$ is the set-specific RNTI corresponding to the RA-preamble set i, i is the index of the RAP set, t_id is the subframe index where the transmitted RA-preamble was sent, f_id is the resource index in frequency domain where the transmitted RA-preamble was sent, $N_i$ is the number of RA-preamble indices in the RA-preamble set i, $N_{i-1}$ is the number of RA-preamble indices in the RA-preamble set i−1, and offset is an integer offset which is common to all RA-preamble sets.

17. The wireless communication method according to 12, wherein
the preamble-specific RNTI is determined by:

$$RNTI_p = (t\_id + 10 * f\_id) * (N\_p + N\_set) + index_p + offset,$$

where $RNTI_p$ is the preamble-specific RNTI corresponding to the RA-preamble p, t_id is the subframe index where the transmitted RA-preamble was sent, f_id is the resource index in frequency domain where the transmitted RA-preamble was sent, N_p is the total number of RA-preamble indices in all RA-preamble sets, N_set is the total number of RA-preamble sets, $index_p$ is the index of the RA-preamble p within the N_p RA-preambles, and offset is an integer offset which is common to all RA-preamble sets.

18. The wireless communication method according to 12 or 17, wherein
the set-specific RNTI is determined by:

$$RNTI_i = (t\_id + 10 * f\_id) * (N\_p + N\_set) - i - 1 + offset, \text{ or}$$

$$RNTI_i = (t\_id + 10 * f\_id) * (N\_p + N\_set) + N\_p + i + offset,$$

where $RNTI_i$ is the set-specific RNTI corresponding to the RA-preamble set i, i is index of the RA-preamble set i, t_id is the subframe index where the transmitted RA-preamble was sent, f_id is the resource index in frequency domain where the transmitted RA-preamble was sent, N_p is the total number of RA-preamble indices in all RA-preamble sets, N_set is the total number of RA-preamble sets, and offset is an integer offset which is common to all RA-preamble sets.

19. The wireless communication method according to 12, wherein
the least significant bits (LSBs) or the most significant bits (MSBs) of the preamble-specific RNTI corresponding to a specific RA-preamble are determined by the index of the specific RA-preamble within all RA-preambles, and the other bits of the preamble-specific RNTI are fixed values.

20. The wireless communication method according to 19, wherein
the set-specific RNTI corresponding to a specific RA-preamble set is a successive value to the values of the preamble-specific RNTIs corresponding to the RA-preambles in the specific RA-preamble set.

21. The wireless communication method according to 19, wherein
the set-specific RNTI corresponding to a specific RA-preamble set is determined by changing one or more bits other than the LSBs or the MSBs of the preamble-specific RNTI corresponding to any RA-preamble in the specific RA-preamble set.

22. An eNode B (eNB) for wireless communication with coverage enhancement (CE), comprising:
a transmitter that transmits one or more medium access control (MAC) random access responses (RARs) to one or more user equipments (UEs) in response to receiving one or more random access preambles (RA-preambles) from the one or more UEs, wherein
the transmitting is able to be performed by a first manner in which the MAC RAR(s) in response to the RA-preamble(s) belonging to one RA-preamble set corresponding to one CE level are carried by a physical downlink shared channel (PDSCH) which is scheduled by a first physical downlink control channel (PDCCH) scrambled by a set-specific radio network temporary identity (RNTI), and the set-specific RNTI is related to the set index of the one RA-preamble set.

23. The eNB according to 22, wherein
the transmitting is performed by one of the first manner and a second manner, and in the second manner, a single MAC RAR in response to one received RA-preamble is carried by a second PDCCH scrambled by a preamble-specific RNTI, and the preamble-specific RNTI is related to the RA-preamble index of the RA-preamble to which the single MAC RAR is in response.

24. A user equipment (UE) for wireless communication with coverage enhancement (CE), comprising:
a transmitter that transmits a random access preamble (RA-preamble) belonging to one RA-preamble set corresponding to one CE level to an eNode B (eNB); and a receiver that receives a first physical downlink control channel (PDCCH) scrambled by a set-specific radio network temporary identity (RNTI) or a second PDCCH scrambled by a preamble-specific RNTI from the eNB, wherein
the first PDCCH schedules a physical downlink shared channel (PDSCH) carrying a medium access control (MAC) random access response (RAR) in response to the transmitted RA-preamble, and the set-specific RNTI is related to the set index of the one RA-preamble set; and the second PDCCH carries the MAC RAR in response to the transmitted RA-preamble, and the preamble-specific RNTI is related to the RA-preamble index of the transmitted RA-preamble.

25. An eNode B (eNB) for wireless communication with coverage enhancement (CE), comprising a memory storing program instructions and a processor, wherein the processor can execute the program instructions to perform any of the above methods for an eNB.

26. A user equipment (UE) for wireless communication with coverage enhancement (CE), comprising a memory storing program instructions and a processor, wherein the processor can execute the program instructions to perform any of the above methods for a UE.

In addition, embodiments of the present disclosure can also provide an integrated circuit which comprises module(s) for performing the step(s) in the above respective communication methods. Further, embodiments of the present can also provide a computer readable storage medium having stored thereon a computer program containing a program code which, when executed on a computing device, performs the step(s) of the above respective communication methods.

What is claimed is:

1. A wireless communication method with coverage enhancement (CE) performed by an eNode B (eNB), the method comprising:
   receiving one or more random access preambles (RA-preambles) from one or more user equipments (UEs); and
   transmitting one or more medium access control (MAC) random access responses (RARs) to the one or UEs in response to the one or more RA-preambles, wherein
   the transmitting is performed by a first manner or by a second manner, wherein,
      in the first manner, the MAC RAR(s) in response to the RA-preamble(s) belonging to one RA-preamble set corresponding to one CE level are carried by a physical downlink shared channel (PDSCH) which is scheduled by a first physical downlink control channel (PDCCH) scrambled by a set-specific radio network temporary identity (RNTI), and the set-specific RNTI is related to a set index of the one RA-preamble set, and
      in the second manner, a single MAC RAR in response to one received RA-preamble is carried by a second PDCCH scrambled by a preamble-specific RNTI, and the preamble-specific RNTI is related to an RA-preamble index of the RA-preamble to which the single MAC RAR is in response, wherein the least significant bits (LSBs) or the most significant bits (MSBs) of the preamble-specific RNTI corresponding to a specific RA-preamble are determined by the index of the specific RA-preamble within all RA-preambles, and the other bits of the preamble-specific RNTI are fixed values.

2. The wireless communication method according to claim claim 1, wherein
the preamble-specific RNTI is determined by:

$$RNTI_{p,i}=(1+t\_id+10*f\_id)*(N_i+1)+index_{p,i}+offset_i$$

where $RNTI_{p,i}$ is the preamble-specific RNTI corresponding to the RA-preamble p in the RA-preamble set i, i is the index of the RA-preamble set, t_id is the subframe index where the RA-preamble corresponding to the transmitted MAC RAR was sent, f_id is the resource index in frequency domain where the RA-preamble corresponding to the transmitted MAC RAR was sent, $N_i$ is the number of RA-preamble indices in the RA-preamble set i, $index_{p,i}$ is the index of the RA-preamble p within the RA-preamble set i, and $offset_i$ is an integer offset which is RA-preamble set specific.

3. The wireless communication method according to claim 1, wherein
the set-specific RNTI is determined by:

$$RNTI_i=(1+t\_id+10*f\_id)*(N_i+1)+N_i+offset_i, or$$

$$RNTI_i=(1+t\_id+10*f\_id)*(N_i+1)-1+offset_i,$$

where $RNTI_i$ is the set-specific RNTI corresponding to the RA-preamble set i is the index of the RA-preamble set, t_id is the subframe index where the RA-preamble corresponding to the transmitted MAC RAR was sent, f_id is the resource index in frequency domain where the RA-preamble corresponding to the transmitted MAC RAR was sent, $N_i$ is the number of RA-preamble indices in the RA-preamble set i, and $offset_i$ is an integer offset which is RA-preamble set specific.

4. The wireless communication method according to claim 1, wherein
the preamble-specific RNTI is determined by:

$$RNTI_{p,i}=(1+t\_id+10*f\_id)*((N_{i-1}+1)*(i+1))+index_{p,i}+offset,$$

where $RNTI_{p,i}$ is the preamble-specific RNTI corresponding to the RA-preamble p in the RA-preamble set i, i is the index of the RA-preamble set, t_id is the subframe index where the RA-preamble corresponding to the transmitted MAC RAR was sent, f_id is the resource index in frequency domain where the RA-preamble corresponding to the transmitted MAC RAR was sent, $N_{i-1}$ is the number of RA-preamble indices in the RA-preamble set i−1, $index_{p,i}$ is the index of the RA-preamble P within the RA-preamble set i, and offset is an integer offset which is common to all RA-preamble sets.

5. The wireless communication method according to claim 1, wherein
the set-specific RNTI is determined by:

$$RNTI_i=(1+t\_id+10*f\_id)*((N_{i-1}+1)*(i+1))+N_i+offset,$$
or
$$RNTI_i=(1+t\_id+10*f\_id)*((N_{i-1}+1)*(i+1))-1+offset,$$

where $RNTI_i$ is the set-specific RNTI corresponding to the RA-preamble set i, i is the index of the RA-preamble set, t_id is the subframe index where the RA-preamble corresponding to the transmitted MAC RAR was sent, f_id is the resource index in frequency domain where the RA-preamble corresponding to the transmitted MAC RAR was sent, $N_i$ is the number of RA-preamble indices in the RA-preamble set i, $N_{i-1}$ is the number of RA-preamble indices in the RA-preamble set i−1, and offset is an integer offset which is common to all RA-preamble sets.

6. The wireless communication method according to claim 1, wherein
the preamble-specific RNTI is determined by:

$$RNTI_p=(t\_id+10*f\_id)*(N\_p+N\_set)+index_p+offset,$$

where $RNTI_p$ is the preamble-specific RNTI corresponding to the RA-preamble p, t_id is the subframe index where the RA-preamble corresponding to the transmitted MAC RAR was sent, f_id is the resource index in frequency domain where the RA-preamble corresponding to the transmitted MAC RAR was sent, N_p is the total number of RA-preamble indices in all RA-preamble sets, N_set is the total number of RA-preamble sets, $index_p$ is the index of the RA-preamble p within the N_p RA-preambles, and offset is an integer offset which is common to all RA-preamble sets.

7. The wireless communication method according to claim 1, wherein
the set-specific RNTI is determined by:

$$RNTI_i=(t\_id+10*f\_id)*(N\_p+N\_set)-i-1+offset, or$$

$$RNTI_i=(t\_id+10*f\_id)*(N\_p+N\_set)+N\_p+i+offset,$$

where $RNTI_i$ is the set-specific RNTI corresponding to the RA-preamble set i, i is index of the RA-preamble set, t_id is the subframe index where the RA-preamble corresponding to the transmitted MAC RAR was sent, f_id is the resource index in frequency domain where the RA-preamble corresponding to the transmitted MAC RAR was sent, N_p is the total number of RA-preamble indices in all RA-preamble sets, N_set is the total number of RA-preamble sets, and offset is an integer offset which is common to all RA-preamble sets.

8. The wireless communication method according to claim 1, wherein
the set-specific RNTI corresponding to a specific RA-preamble set is a successive value to the values of the preamble-specific RNTIs corresponding to the RA-preambles in the specific RA-preamble set.

9. The wireless communication method according to claim 1, wherein
the set-specific RNTI corresponding to a specific RA-preamble set is determined by changing one or more bits other than the LSBs or the MSBs of the preamble-specific RNTI corresponding to any RA-preamble in the specific RA-preamble set.

10. A wireless communication method with coverage enhancement (CE) performed by a user equipment (UE), the method comprising:
transmitting a random access preamble (RA-preamble) belonging to one RA-preamble set corresponding to one CE level to an eNode B (eNB); and
receiving a first physical downlink control channel (PDCCH) scrambled by a set-specific radio network temporary identity (RNTI) or a second PDCCH scrambled by a preamble-specific RNTI from the eNB, wherein
the first PDCCH schedules a physical downlink shared channel (PDSCH) carrying a medium access control (MAC) random access response (RAR) in response to the transmitted RA-preamble, and the set-specific RNTI is related to a set index of the one RA-preamble set; and
the second PDCCH carries the MAC RAR in response to the transmitted RA-preamble, and the preamble-specific RNTI is related to an RA-preamble index of the transmitted RA-preamble, wherein the least significant bits (LSBs) or the most significant bits (MSBs) of the preamble-specific RNTI corresponding to a specific RA-preamble are determined by the index of the specific RA-preamble within all RA-preambles, and the other bits of the preamble-specific RNTI are fixed values.

11. The wireless communication method according to claim 10, wherein
the preamble-specific RNTI is determined by:

$$RNTI_{p,i}=(1+t\_id+10*f\_id)*(N_i+1)+index_{p,i}+offset_i$$

where $RNTI_{p,i}$ is the preamble-specific RNTI corresponding to the RA-preamble p in the RA-preamble set i, i is the index of the RA-preamble set, t_id is the subframe index where the RA-preamble corresponding to the transmitted MAC RAR was sent, f_id is the resource index in frequency domain where the RA-preamble corresponding to the transmitted MAC RAR was sent, $N_i$ is the number of RA-preamble indices in the RA-preamble set i, $index_{p,i}$ is the index of the RA-preamble p within the RA-preamble set i, and $offset_i$ is an integer offset which is RA-preamble set specific.

12. The wireless communication method according to claim 10, wherein
the set-specific RNTI is determined by:

$$RNTI_i=(1+t\_id+10*f\_id)*(N_i+1)+N_i+offset_i, \text{ or}$$

$$RNTI_i=(1+t\_id+10*f\_id)*(N_i+1)-1+offset_i,$$

where $RNTI_i$ is the set-specific RNTI corresponding to the RA-preamble set i, i is the index of the RA-preamble set, t_id is the subframe index where the RA-preamble corresponding to the transmitted MAC RAR was sent, f_id is the resource index in frequency domain where the RA-preamble corresponding to the transmitted MAC RAR was sent, $N_i$ is the number of RA-preamble indices in the RA-preamble set i, and $offset_i$ is an integer offset which is RA-preamble set specific.

13. The wireless communication method according to claim 10, wherein
the preamble-specific RNTI is determined by:

$$RNTI_{p,i}=(1+t\_id+10*f\_id)*((N_{i-1}+1)*(i+1))+index_{p,i}+offset,$$

where $RNTI_{p,i}$ is the preamble-specific RNTI corresponding to the RA-preamble p in the RA-preamble set i, i is the index of the RA-preamble set, t_id is the subframe index where the RA-preamble corresponding to the transmitted MAC RAR was sent, f_id is the resource index in frequency domain where the RA-preamble corresponding to the transmitted MAC RAR was sent, $N_{i-1}$ is the number of RA-preamble indices in the RA-preamble set i−1, $index_{p,i}$ is the index of the RA-preamble p within the RA-preamble set i, and offset is an integer offset which is common to all RA-preamble sets.

14. The wireless communication method according to claim 10, wherein
the set-specific RNTI is determined by:

$$RNTI_i=(1+t\_id+10*f\_id)*((N_{i-1}+1)*(i+1))+N_i+offset,$$
or
$$RNTI_i=(1+t\_id+10*f\_id)*((N_{i-1}+1)*(i+1))-1+offset,$$

where $RNTI_i$ is the set-specific RNTI corresponding to the RA-preamble set i, i is the index of the RA-preamble set, t_id is the subframe index where the RA-preamble corresponding to the transmitted MAC RAR was sent, f_id is the resource index in frequency domain where the RA-preamble corresponding to the transmitted MAC RAR was sent, $N_i$ is the number of RA-preamble indices in the RA-preamble set i, $N_{i-1}$ is the number of RA-preamble indices in the RA-preamble set i−1, and offset is an integer offset which is common to all RA-preamble sets.

15. The wireless communication method according to claim 10, wherein
the preamble-specific RNTI is determined by:

$$RNTI_p=(t\_id+10*f\_id)*(N\_p+N\_set)+index_p+offset,$$

where $RNTI_p$ is the preamble-specific RNTI corresponding to the RA-preamble p, t_id is the subframe index where the RA-preamble corresponding to the transmitted MAC RAR was sent, f_id is the resource index in frequency domain where the RA-preamble corresponding to the transmitted MAC RAR was sent, N_p is the total number of RA-preamble indices in all RA-preamble sets, N_set is the total number of RA-preamble sets, $index_p$ is the index of the RA-preamble p within the N_p RA-preambles, and offset is an integer offset which is common to all RA-preamble sets.

16. The wireless communication method according to claim 10, wherein
the set-specific RNTI is determined by:

$$RNTI_i=(t\_id+10*f\_id)*(N\_p+N\_set)-i-1+offset, \text{ or}$$

$$RNTI_i=(t\_id+10*f\_id)*(N\_p+N\_set)+N\_p+i+offset,$$

where $RNTI_i$ is the set-specific RNTI corresponding to the RA-preamble set i, i is index of the RA-preamble set, t_id is the subframe index where the RA-preamble corresponding to the transmitted MAC RAR was sent, f_id is the resource index in frequency domain where the RA-preamble corresponding to the transmitted MAC RAR was sent, N_p is the total number of RA-preamble indices in all RA-preamble sets, N_set is the total number of RA-preamble sets, and offset is an integer offset which is common to all RA-preamble sets.

17. The wireless communication method according to claim 10, wherein
the set-specific RNTI corresponding to a specific RA-preamble set is a successive value to the values of the preamble-specific RNTIs corresponding to the RA-preambles in the specific RA-preamble set.

18. The wireless communication method according to claim 10, wherein
the set-specific RNTI corresponding to a specific RA-preamble set is determined by changing one or more bits other than the LSBs or the MSBs of the preamble-specific RNTI corresponding to any RA-preamble in the specific RA-preamble set.

19. An eNode B (eNB) for wireless communication with coverage enhancement (CE), comprising:
a receiver, which, in operation, receives one or more random access preambles (RA-preambles) from one or more user equipments (UEs); and
a transmitter, which, in operation, transmits one or more medium access control (MAC) random access responses (RARs) to the one or more UEs in response to the one or more RA-preambles, wherein
the transmitting is performed by a first manner or by a second manner, wherein,
in the first manner, the MAC RAR(s) in response to the RA-preamble(s) belonging to one RA-preamble set corresponding to one CE level are carried by a physical downlink shared channel (PDSCH) which is scheduled by a first physical downlink control channel (PDCCH) scrambled by a set-specific radio network temporary identity (RNTI), and the set-specific RNTI is related to a set index of the one RA-preamble set, and
in the second manner, a single MAC RAR in response to one received RA-preamble is carried by a second PDCCH scrambled by a preamble-specific RNTI, and the preamble-specific RNTI is related to an RA-preamble index of the RA-preamble to which the single MAC RAR is in response, wherein the least significant bits (LSBs) or the most significant bits (MSBs) of the preamble-specific RNTI corresponding to a specific RA-preamble are determined by the index of the specific RA-preamble within all RA-preambles, and the other bits of the preamble-specific RNTI are fixed values.

20. A user equipment (UE) for wireless communication with coverage enhancement (CE), comprising:
a transmitter, which, in operation, transmits a random access preamble (RA-preamble) belonging to one RA-preamble set corresponding to one CE level to an eNode B (eNB); and
a receiver, which, in operation, receives a first physical downlink control channel (PDCCH) scrambled by a set-specific radio network temporary identity (RNTI) or a second PDCCH scrambled by a preamble-specific RNTI from the eNB, wherein
the first PDCCH schedules a physical downlink shared channel (PDSCH) carrying a medium access control (MAC) random access response (RAR) in response to the transmitted RA-preamble, and the set-specific RNTI is related to a set index of the one RA-preamble set; and
the second PDCCH carries the MAC RAR in response to the transmitted RA-preamble, and the preamble-specific RNTI is related to an RA-preamble index of the transmitted RA-preamble, wherein the least significant bits (LSBs) or the most significant bits (MSBs) of the preamble-specific RNTI corresponding to a specific RA-preamble are determined by the index of the specific RA-preamble within all RA-preambles, and the other bits of the preamble-specific RNTI are fixed values.

* * * * *